United States Patent Office 3,544,584
Patented Dec. 1, 1970

3,544,584
CERTAIN 5-ALKYL-3-HYDROXYISOXAZOLES
Issei Iwai, Yukichi Kishida, Tetsuo Hiraoka, and Norio Nakamura, Tokyo, Japan, assignors to Sankyo Company Limited, Tokyo, Japan
No Drawing. Continuation of application Ser. No. 485,914, Sept. 8, 1965. This application Oct. 1, 1968, Ser. No. 767,053
Claims priority, application Japan, Sept. 14, 1964, 39/52,515; June 12, 1965, 40/34,828
Int. Cl. C07d 85/22
U.S. Cl. 260—307
7 Claims

ABSTRACT OF THE DISCLOSURE

Process for the preparation of 3-hydroxy-5-substituted (or unsubstituted) isoxazoles. The corresponding acetylenic acid alkyl esters are reacted with hydroxylamine in the presence of an alkali metal hydroxide. New 3-hydroxy-5-substituted (or unsubstituted) isoxazoles are disclosed which are useful as an agricultural fungicide.

SUMMARY OF THE INVENTION

This is a continuation of application Ser. No. 485,914 filed on Sept. 8, 1965 and now abandoned.

This invention relates to a novel process for preparing 3-hydroxyisoxazole derivatives and also to certain novel 3-hydroxyisoxazole derivatives. More particularly, it relates to a novel process for preparing 3-hydroxyisoxazole derivatives having the formula

(I)

wherein R represents hydrogen; an alkyl group such as methyl, ethyl, n-propyl, isopropyl, n-butyl, isobutyl, sec.-butyl, tert.-butyl, pentyl, hexyl, heptyl, octyl or decyl; an unsubstituted or substituted phenyl group such as phenyl, p-, m- or o-nitrophenyl, p-, m- or o-aminophenyl, p-, m- or o-alkylphenyl for example p-methylphenyl, o-ethylphenyl, p-n-propylphenyl or m-n-butylphenyl, p-, m- or o-alkoxyphenyl for example p-methoxyphenyl, p-ethoxyphenyl, m-methoxyphenyl, o-n-propoxyphenyl or p-n-butoxpyhenyl or p, m- or o-halogenophenyl for example p-, m- or o-bromophenyl or p-, m- or o-chlorophenyl; or a dialkoxymethyl group containing 1–5 carbon atoms in each alkoxy moiety such as dimethoxymethyl, diethoxymethyl or di(n-propoxy)methyl.

In a more particular aspect, this invention pertains also to novel 3-hydroxyisoxazole derivatives having the formula

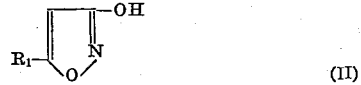

(II)

wherein $R_1$ represents hydrogen; an alkyl group such as methyl, ethyl, n-propyl, isopropyl, n-butyl, isobutyl, sec.-butyl, tert.-butyl, pentyl, hexyl, heptyl, octyl or decyl; or a dialkoxymethyl group containing 1–5 carbon atoms in each alkoxy moiety such as dimethoxymethyl, diethoxymethyl or di(n-propoxy)methyl.

The 3-hydroxyisoxazole derivatives having the above Formula I produced by the process in accordance with this invention have been found by us to be useful as an agricultural pesticide for controlling soil-born diseases.

More specifically, the novel 3-hydroxyisoxazole derivatives having the above Formula II of this invention have been found to be remarkably effective for preventing and controlling of various types of soil-born diseases caused by a number of pathogenic fungi such as those in the genus of Pellicularia, Fusarium, Pythium and the like, for example, *Pellicularia filamentosa*, *Fusarium oxysporum* or *Pythium aphanidermatum*. Particularly, in the preferred group of the 3-hydroxyisoxazole derivatives having the above Formula II, there are included 3-hydroxy-5-methylisoxazole, 3-hydroxy-5-ethylisoxazole, 3-hydroxy-5-n-propylisoxazole, 3-hydroxy-5-isopropylisoxazole, 3-hydroxy-5-n-butylisoxazole, 3-hydroxy-5-isobutylisoxazole, 3-hydroxy-5-decylisoxazole, 3 - hydroxyisoxazole-5-aldehyde diethyl acetal and the like and 3-hydroxy-5-methylisoxazole is most effective for the contemplated pesticidal purpose. Further, these preferred compounds are practically non-toxic to plants and mammals. And, the 3-hydroxyisoxazole derivatives having the above Formula I have also been found to be a valuable intermediate for synthesizing ibotenic acid, a newly-found dibasic amino acid which has been recently found to be very useful as a seasoning and to possess flykilling and narcosis potentiating activities. For instance, among these 3-hydroxyisoxazole derivatives, the 3-hydroxy-5-dialkoxymethylisoxazoles for example 3-hydroxyisoxazole-5-aldehyde dimethyl acetal, 3-hydroxyisoxazole-5-aldehyde diethyl acetal or 3-hydroxyisoxazole-5-aldehyde di(n-propyl) acetal are particularly suitable intermediates for synthesizing ibotenic acid. For example, these 3-hydroxy-5-dialkoxymethylisoxazoles are hydrolysed with a conventional mean to afford 3-hydroxyisoxazole-5-aldehyde and the latter compound is reacted with ammonium halide and alkali metal cyanide followed by hydrolysis to obtain the desired ibotenic acid.

Heretofore, as a sole prior process for the preparation of 3-hydroxyisoxazole compound, the process reported by P. Bravo et al. in Gazzetta Chimica Italiana, vol. 91, 47 (1961) has been known. The said prior process comprises reacting phenylacetylene magnesium bromide with dichloroformaldoxime to produce 3-chloro-5-phenylisoxazole, reacting the latter compound with methanol in the presence of potassium hydroxide to produce 3-methoxy-5-phenylisoxazole and finally treating the latter compound with hydrogen bromide to obtain 3-hydroxy-5-phenylisoxazole. The prior process may not, however, be considered to be advantageous in industrial scale because of difficulty in availability of dichloroformaldoxime and a number of steps involved. And further, in Bulletin de la Société Chimique de France, IV, 1, 1088 (1907), it was reported that 5-hydroxyisoxazole derivative could be prepared by reacting propiolic acid ester with hydroxylamine prepared from its hydrochloride and sodium ethoxide in a molar ratio of 1:1.

In view of the prior art as disclosed hereinabove, numerous investigations have been made by us in order to find out a novel and advantageous process for preparing 3-hydroxyisoxazole derivatives and the utility of the 3-hydroxyisoxazole derivative. As one of the results of our investigations, it has now been found that 3-hydroxyisoxazole derivatives can be obtained in a high yield with a simple procedure comprising only one step, that is, reaction of acetylenic acid alkyl ester with hydroxylamine in the presence of an alkali metal hydroxide. Moreover, as another result of our investigations, it has also been found that the 3-hydroxyisoxazole derivatives having the above Formula I, particularly, those of the above Formula II exhibit a remarkable effect for controlling soil-born diseases caused by pathogenic fungi. From the standpoint of the above prior art, it will be understood that these discoveries are quite surprising and unexpected.

Therefore, it is an object of this invention to provide a novel and commercially available process for preparing the 3-hydroxyisoxazole derivatives having the above Formula I with a simple procedure. It is also an object of this invention to provide a new class of the 3-hydroxyisoxazole derivatives having the above Formula II which exhibit remarkable and unexpected effects for preventing and controlling various soil-born diseases caused by pathogenic fungi. These and other objects of this invention will become apparent from the following detailed description.

In one aspect of this invention, the process in accordance with this invention is characterized in that the acetylenic acid alkyl ester having the formula $$R-C \equiv C-COOR' \quad (III)$$

wherein R is as defined above and R' represents an alkyl group containing 1–5 carbon atoms such as methyl, ethyl, propyl or butyl is reacted with hydroxylamine in the presence of an alkali metal hydroxide to produce the 3-hydroxyisoxazole derivative having the above Formula I.

In one embodiment of the process in accordance with this invention, the starting acetylenic acid ester is reacted with hydroxylamine in the presence of an alkali metal hydroxide and in the presence of a suitable solvent. Though it is not essential in the reaction to employ a suitable solvent, it is desirable to employ such suitable solvent as water, water-miscible organic solvent, for example, alcohols, dioxane, tetrahydrofuran and the like or a mixture thereof, and if employed, among others, aqueous alcohols for example aqueous methanol or aqueous ethanol are most preferable. Suitable alkali metal hydroxide to be employed are sodium, potassium and lithium hydroxides and sodium hydroxide or potassium hydroxide is most preferable. The reaction time and temperature are not critical features of this invention. Generally speaking, the reaction is usually carried out at a temperature ranging from above room temperature or about 20° C. to a reflux temperature of the solvents employed. The reaction time will depend upon the reaction temperature employed and the reaction is generally carried out for about 1–20 hours, and preferably at about 30–60° C. for about 11–18 hours. The reagent, hydroxylamine, may be in the form of a free base or an acid addition salt, but practically its acid addition salt such as hydrochloride, sulfate and the like is most desirable. It is desirable in the process of this invention that a sufficient amount of an alkali metal hydroxide is employed to maintain the reaction medium at an alkaline pH range, because the undesirable by-product may be formed in the acidic or neutral reaction medium, resulting in lowering the yield of the desired product. Usually, an acetylenic acid ester, hydroxylamine and an alkali metal hydroxide in the reaction are employed in a molar ratio of about 1:1:above 3, respectively.

Further, more specifically, it was proved that where the reaction is carried out below room temperature, the novel intermediate hydroxamic acid compound having the following Formula IV is formed during the course of the reaction;

wherein R is as defined above and also that the intermediate having the above Formula IV is maintained above room temperature in the presence of an alkali metal hydroxide to form the desired product. Accordingly, in another embodiment of the process in accordance with this invention, the 3-hydroxyisoxazole derivatives having the above Formula I may be prepared by reacting the starting acetylenic acid ester having the above Formula III with hydroxylamine in the presence of an alkali metal hydroxide below room temperature or below about 20° C., preferably at about 0–15° C., to form the intermediate having the above Formula IV, isolating the latter compound with a conventional mean and then maintaining the latter compound thus isolated above room temperature in the presence of an alkali metal hydroxide. However, it will be understood by those skilled in the art that the reaction conducted above room temperature is practically and economically preferable in order to utilize the 3-hydroxyisoxazole derivatives having the above Formula I.

After completion of the reaction, the desired product of the above Formula I may be recovered and purified by any of conventional methods. For instance, the reaction mixture is made acidic with a suitable acid for example hydrochloric acid, the acidic mixture is extracted with a suitable extract solvent for example ether, the extract is washed with water or saturated aqueous sodium chloride solution, the solvent is distilled off and then the residue is recrystallized from a suitable solvent for example n-hexane to obtain the desired product in a purified form.

The starting acetylenic acid esters in which R is a dialkoxymethyl group are novel compounds and may be prepared from propargylaldehyde dialkyl acetal by a procedure comprising reaction with alkylmagnesiumhalide or alkali metal amide, reaction with carbon dioxide, hydrolysis and subsequent esterification.

The reaction in the process of this invention is represented by the following equation;

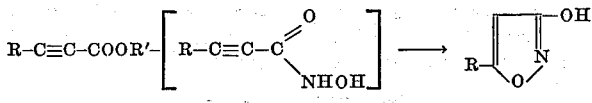

wherein R and R' are as defined above.

This invention will be described in further detail in the following examples which are presented by way of illustration only and not as limiting the scope of this invention.

EXAMPLE 1

To a solution of 4.9 g. of ethyl propiolate in 100 ml. of ethanol is added a solution of 13.9 g. of hydroxylamine hydrochloride in 180 ml. of a 10% aqueous sodium hydroxide solution and the mixture is allowed to stand at room temperature overnight. Thereafter, the reaction mixture is made acidic with concentrated hydrochloric acid and the acidic mixture is extracted with ether three times. The combined extract is washed with a saturated aqueous solution of sodium chloride, dried over anhydrous sodium sulfate and then the ether distilled off. The residue is recrystallized from n-hexane to give 2.5 g. of 3-hydroxyisoxazole as white crystals melting at 98–99° C. Yield: 59%.

Analysis.—Calculated for $C_3H_3O_2N$ (percent): C, 42.36; H, 3.55; N, 16.47. Found (percent): C, 42.42; H, 3.55; N, 16.60.

EXAMPLE 2

To a solution of 5.6 g. of ethyl tetrolate in 100 ml. of ethanol is added a solution of 13.9 g. of hydroxylamine hydrochloride in 180 ml. of a 10% aqueous sodium hydroxide solution and the mixture is allowed to stand at room temperature overnight. Thereafter, the reaction mixture is treated in the same manner as in Example 1 to give 3.3 g. of 3-hydroxy-5-methylisoxazole as colorless needles melting at 85–86° C. Yield: 74%.

Analysis.—Calculated for $C_4H_8O_2N$ (percent): C, 48.48; H, 5.09; N, 14.14. Found (percent): C, 48.60; H, 5.14; N, 13.09.

In the same way as described above, the following 3-hydroxy-5-alkyl-isoxazoles are prepared from the corresponding acetylenic acid esters;

3-hydroxy-5-ethylisoxazole (melting point, 45–46° C.),
3-hydroxy-5-n-propylisoazole (melting point, 41–41.5° C.),
3-hydroxy-5-isopropylisoxazole (melting point, 41–42° C),
3-hydroxy-5-n-butylisoxazole (melting point, 38.5–39.5° C.),
3-hydroxy-5-isobutylisoxazole [boiling point, 128–133° C./3 mm. (bath temperature)], and
3-hydroxy-5-decylisoxazole (melting point, 65.5–66.5° C.).

EXAMPLE 3

To a solution of 6.9 g. of ethyl phenylpropiolate in 160 ml. of ethanol is added a solution of 8.4 g. of hydroxylamine hydrochloride in 160 ml. of a 10% aqueous sodium hydroxide solution and the mixture is allowed to stand at room temperature overnight. Thereafter, the pH of the reaction mixture is adjusted to pH 2.0 with concentrated hydrochloric acid and the acidic mixture is extracted twice with ether. The combined extract is thoroughly washed with water, dried over anhydrous sodium sulfate and subsequently the ether is distilled off. The residue is recrystallized from ethanol to give 5.6 g. of 3-hydroxy-5-phenylisoxazole as white prisms melting at 163–165° C. Yield: 87%.

Analysis.—Calculated for $C_9H_7O_2N$ (percent): C, 67.07; H, 4.38; N, 8.69. Found (percent): C, 66.78; H, 4.30; N, 8.80.

EXAMPLE 4

To a solution of 7.3 g. of ethyl p-nitrophenylpropiolate in 100 ml. of ethanol is added with ice-cooling a solution of 6.7 g. of hydroxylamine hydrochloride in 100 ml. of a 10% aqueous sodium hydroxide solution and the mixture is allowed to stand at room temperature overnight. Thereafter, the reactive mixture is made acidic with concentrated hydrochloric acid, the acidic mixture is extracted three times with ether and the combined extract is thoroughly washed with water, dried over anhydrous sodium sulfate and then the ether is distilled off. The residue is recrystallized from ethanol to give 5.3 g. of 3-hydroxy-5-p-nitrophenylisoxazole as yellow needles melting at 224–226° C. (decomp.). Yield: 82%.

Analysis.—Calculated for $C_9H_6O_4N_2$ (percent): C, 52.43; H, 2.93; N, 13.59. Found (percent): C, 52.68; H, 2.91; N, 13.38.

EXAMPLE 5

To a mixture of 26.0 g. of hydroxylamine hydrochloride, 300 ml. of a 10% aqueous sodium hydroxide solution and 200 ml. of ethanol is added dropwise a solution of 50 g. of ethyl 4,4-diethoxytetrolate while maintaining at 12–14° C. with ice-cooling and then the mixture is maintained at 30° C. for additional 16 hours. Thereafter, the pH of the reaction mixture is adjusted to pH 6 with acetic acid and the acidic extract is extracted five times with ether. The combined extract is dried over anhydrous sodium sulfate and the ether is distilled off. The residue is recrystallized from n-hexane to give 28.4 g. of 3-hydroxyisoxazole-5-aldehyde diethyl acetal as prisms melting at 86–87° C. Yield: 61.0%.

Analysis.—Calculated for $C_8H_{13}O_4N$ (percent): C, 51.33; H, 7.00; N, 7.48. Found (percent): C, 51.52; H, 6.96; N, 7.52.

EXAMPLE 6

To a mixture of 4.3 g. of hydroxylamine hydrochloride and 70 ml. of a 10% aqueous sodium hydroxide solution is added dropwise a solution of 8.2 g. of ethyl 4,4-diethoxytetrolate in 70 ml. of ethanol while maintaining at 10–15° C. and then the mixture is maintained at 10–15° C. for additional 12 hours. Thereafter, the pH of the reaction mixture is adjusted to pH 6 with acetic acid and the acidic mixture is several times extracted with ether. The extract is dried over anhydrous sodium sulfate and the solvent is distilled off. The results is recrystallized from a mixture of benzene and n-hexane to give 5.0 g. of 4,4-diethoxytetrolohydroxamic acid, melting at 73–74° C. Yield: 65.2%.

Analysis.—Calculated for $C_8H_{13}O_4N$ (percent): C, 51.33; H, 7.00; N, 7.48. Found (percent): C, 51.10; H, 7.03; N, 7.33.

A solution of 3.5 g. of 4,4-diethoxytetrolohydroxamic acid thus obtained in 30 ml. of a 10% aqueous sodium hydroxide solution is allowed to stand at 30° C. for 12 hours. Thereafter, the pH of the reaction mixture is adjusted to pH 6 with acetic acid and the acidic mixture is several times extracted with ether. The combined extract is dried over anhydrous sodium sulfate, the ether is distilled off and the residue is recrystallized from n-hexane to give 2.7 g. of 3-hydroxyisoxazole-5-aldehyde diethylacetal as prisms melting at 86–87° C.

EXAMPLE 7

To a mixture of 1.31 g. of hydroxylamine hydrochloride 15 ml. of a 10% aqueous sodium hydroxide solution and 10 ml. of ethanol is added dropwise a solution of 1.76 g. of ethyl tetrolate in 5 ml. of ethanol at 0° C. The resulting mixture is stirred at 5–10° C. for additional 30 minutes. Thereafter, the reaction mixture is neutralized with concentrated hydrochloric acid to pH 3 and the acidic mixture is extracted with ether three times. The combined extract is dried over anhydrous sodium sulfate, the ether is distilled off under reduced pressure at room temperature and the residue is recrystallized from a mixture of methanol and benzene to give 1.48 g. of tetrolohydroxamic acid, melting at 143–144° C.

A solution of 1 g. of the tetrolohydroxamic acid thus obtained in 50 ml. of a 10% aqueous sodium hydroxide solution is allowed to stand at 30° C. overnight. The reaction mixture is then made acidic to pH 2–3 with concentrated hydrochloric acid and the acidic mixture is extracted with ether. The extract is dried over anhydrous sodium sulfate, the ether is distilled off and then the residue is recrystallized from n-hexane to give 0.75 g. of 3-hydroxy-5-methylisoxazole, melting at 85–86° C. Yield: 75%.

What is claimed is:
1. A compound having the formula

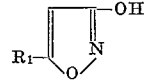

wherein $R_1$ is alkyl of from 1 to 10 carbon atoms.
2. 3-hydroxy-5-methylisoxazole.
3. 3-hydroxy-5-ethylisoxazole.
4. 3-hydroxy-5-n-propylisoxazole.
5. 3-hydroxy-5-isopropylisoxazole.
6. 3-hydroxy-5-n-butylisoxazole.
7. 3-hydroxy-5-isobutylisoxazole.

References Cited

UNITED STATES PATENTS 3,242,190  3/1966  Hafliger et al. _____ 260—307.1

OTHER REFERENCES

Boulton et al., Tetrahedron, vol. 20 (1964) pp. 2835–2840.

Goerdeler et al., Berichte vol. 96 (1963) pp. 951–952.

Katritsky et al., Proc. Chem. Soc., London 1961 pp. 387–8.

Moureu et al., Bull. Soc. Chem., France, vol. 1 (1907) pp. 1092–6.

Wiley, Hetrocyclic Compounds, vol. 17 (1962) p. 151.

ALEX MAZEL, Primary Examiner

R. J. GALLAGHER, Assistant Examiner

U.S. Cl. X.R.

260—484, 501; 424—272